United States Patent
Hsiao

(10) Patent No.: US 11,755,641 B2
(45) Date of Patent: Sep. 12, 2023

(54) IMAGE SEARCHES BASED ON WORD VECTORS AND IMAGE VECTORS

(71) Applicant: GUANGDONG OPPO MOBILE TELECOMMUNICATIONS CORP., LTD., Dongguan (CN)

(72) Inventor: Jenhao Hsiao, Palo Alto, CA (US)

(73) Assignee: GUANGDONG OPPO MOBILE TELECOMMUNICATIONS CORP., LTD.

(*) Notice: Subject to any disclaimer, the term of this patent is extended or adjusted under 35 U.S.C. 154(b) by 0 days.

(21) Appl. No.: 17/575,209

(22) Filed: Jan. 13, 2022

(65) Prior Publication Data

US 2022/0138252 A1    May 5, 2022

Related U.S. Application Data

(63) Continuation of application No. PCT/CN2020/091055, filed on May 19, 2020.

(Continued)

(51) Int. Cl.
*G06F 16/00* (2019.01)
*G06F 16/583* (2019.01)
(Continued)

(52) U.S. Cl.
CPC .......... *G06F 16/5846* (2019.01); *G06F 16/53* (2019.01); *G06F 16/538* (2019.01); *G06F 16/56* (2019.01)

(58) Field of Classification Search
CPC .... G06F 16/5846; G06F 16/53; G06F 16/538; G06F 16/56; G06F 16/583
See application file for complete search history.

(56) References Cited

U.S. PATENT DOCUMENTS 10,503,775 B1 * 12/2019 Ranzinger .............. G06N 3/045
10,769,502 B1 * 9/2020 Berg ....................... G06F 16/53
(Continued)

FOREIGN PATENT DOCUMENTS

| CN | 102073748 A | 5/2011 |
| CN | 106682060 A | 5/2017 |
| GB | 2544853 A | 5/2017 |

OTHER PUBLICATIONS

International Search Report and the Written Opinion dated Aug. 21, 2020 From the International Searching Authority Re. Application No. PCT/CN2020/091055.

(Continued)

*Primary Examiner* — Jared M Bibbee
(74) *Attorney, Agent, or Firm* — ADSERO IP

(57) ABSTRACT

A mobile device hosts an artificial intelligence model trained for text-based image searches. Images associated with an image album of the mobile device are indexed by generating, based on the artificial intelligence model, image vectors from the images and word vectors from the image vectors. In response to user input that includes text representing a keyword search, a word vector is generated from the text based on the artificial model. A match is determined between the word vector and one or more of the word vectors to generate a search result that identifies one or more images corresponding to the one or more word vectors. The mobile device displays the search result on a user interface.

18 Claims, 9 Drawing Sheets

Related U.S. Application Data

(60) Provisional application No. 62/895,309, filed on Sep. 3, 2019.

(51) Int. Cl.
*G06F 16/53* (2019.01)
*G06F 16/538* (2019.01)
*G06F 16/56* (2019.01)

(56) References Cited

U.S. PATENT DOCUMENTS

| | | | | |
|---|---|---|---|---|
| 2017/0249339 | A1* | 8/2017 | Lester | G06F 16/56 |
| 2017/0262478 | A1* | 9/2017 | Zepeda Salvatierra | G06N 20/10 |
| 2019/0108242 | A1* | 4/2019 | Liu | G06F 16/5846 |
| 2019/0108280 | A1* | 4/2019 | Liu | G06F 16/951 |
| 2019/0347357 | A1* | 11/2019 | Murali | G06F 16/5866 |
| 2023/0018383 | A1* | 1/2023 | Yang | G06F 16/532 |

OTHER PUBLICATIONS

Liu, Xiaojiang, Design and Implementation of Album Application Based on Semantic Tag Organization and Retrieval Methods, Chinese Master's Theses Full-text Database (Information Science and Technology), Jun. 15, 2016, ISSN: 1674-0246 main body, pp. 14-20.

K He, X Zhang, S Ren, J Sun, Deep Residual Learning for Image Recognition, Computer Vision and Pattern Recognition (CVPR), 2016.

Jason Weston, Samy Bengio, and Nicolas Usunier. Large scale image annotation: learning to rank with joint word-image embeddings. Machine Learning, 81(1):21-35, 2010.

Andrea Frome et al, DeViSE: A Deep Visual-Semantic Embedding Model, NIPS 2013.

Tomas Mikolov, Kai Chen, Greg S. Corrado, and Jeffrey Dean. Efficient estimation of word representations in vector space. In International Conference on Learning Representations (ICLR), Scottsdale, Arizona, USA, 2013.

* cited by examiner

IMAGE SEARCHES BASED ON WORD VECTORS AND IMAGE VECTORS

CROSS-REFERENCE TO RELATED APPLICATIONS

This application is a continuation of International Application No. PCT/CN2020/091055 filed on May 19, 2020, entitled "IMAGE SEARCHES BASED ON WORD VECTORS AND IMAGE VECTORS", which claims priority to a U.S. Provisional Application No. 62/895,309 filed on Sep. 3, 2019, entitled "IMAGE SEARCHES BASED ON WORD VECTORS AND IMAGE VECTORS" the disclosures of which are incorporated in their entirety by reference herein.

BACKGROUND

This disclosure relates in general to image searches, and more specifically, and without limitation, to methods for embedding image features and text features into an embedding space usable for image searches on a computing device.

Image searches enable computing device users to provide a keyword input and receive a collection of images related to the keyword. Typically, a computing device, such as a mobile phone, implements a search engine to search and return images from an image album, where the search engine uses pre-defined categories. Upon receiving an image, the search engine associates the image with a pre-defined category. Upon receiving a search request that includes a keyword, the search engine matches the keyword with the pre-defined category and presents the image as a search result.

This category-based searching allows searches for images having exact matches between a keyword and a pre-defined category. However, the performance of the search engine can be limited to the exact matches. For example, an image album may have a category pre-defined as "car." Upon receiving "car" as a keyword, related images are presented on the computing device. However, if "vehicle" was received as the keyword, no images are returned, despite that "car" and "vehicle" indicate the same search intent.

Aspects of the present invention address these and other problems individually and collectively.

BRIEF SUMMARY

Embodiments of the present disclosure relate to techniques that involve a system, non-transitory computer readable media, and a method for performing image searches. In an example, the techniques include generating an image vector from an image based on an artificial model, generating a first word vector from the image vector based on the artificial model, receiving a query associated with an image search, generating, based on the artificial model, a second word vector from text associated with the query, determining a match between the first word vector and the second word vector, and generating, based on the match, a search result that identifies the image.

In an example, the techniques are implemented on a mobile device. In this example, the mobile device stores the artificial model in one or more memories of the mobile device and displays the search result on a user interface of the mobile device. Further, the mobile device stores the image in association with an image album and stores word vectors for images associated with the photo album. The match is determined based on Euclidean distances between the first word vector and the word vectors. Displaying the search result includes displaying a subset of the images in an order of smallest Euclidean distance to largest Euclidean distance.

In an example, the techniques also include training the artificial model by at least generating, based on the artificial model, a third word vector from a label associated with a training image, generating, based on the artificial model, a second image vector from the training image, generating, based on the artificial model, a first predicted word vector from the second image vector, computing a loss of the artificial model based on the third word vector and the first predicted word vector, and updating a parameter of the artificial model based on the loss. The training also includes generating, based on the artificial model, a second predicted word vector from the second image vector, and generating a triplet that includes the third word vector, the first predicted word vector, and the second predicted word vector. The loss is computed based on the triplet. Computing the loss includes computing a total distance of the triplet based on third word vector, the first predicted word vector, and the second predicted word vector, and wherein the loss is based on the total distance.

In an example, the artificial model includes a language model, a visual model, and a visual-semantic model. The Image vector is an output of the visual model, wherein the first word vector is an output of the visual-semantic model, and wherein the second word vector is an output of the language model. The visual-semantic model is trained based on word vectors that are output from the language model and on image vectors that are output of the visual model.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
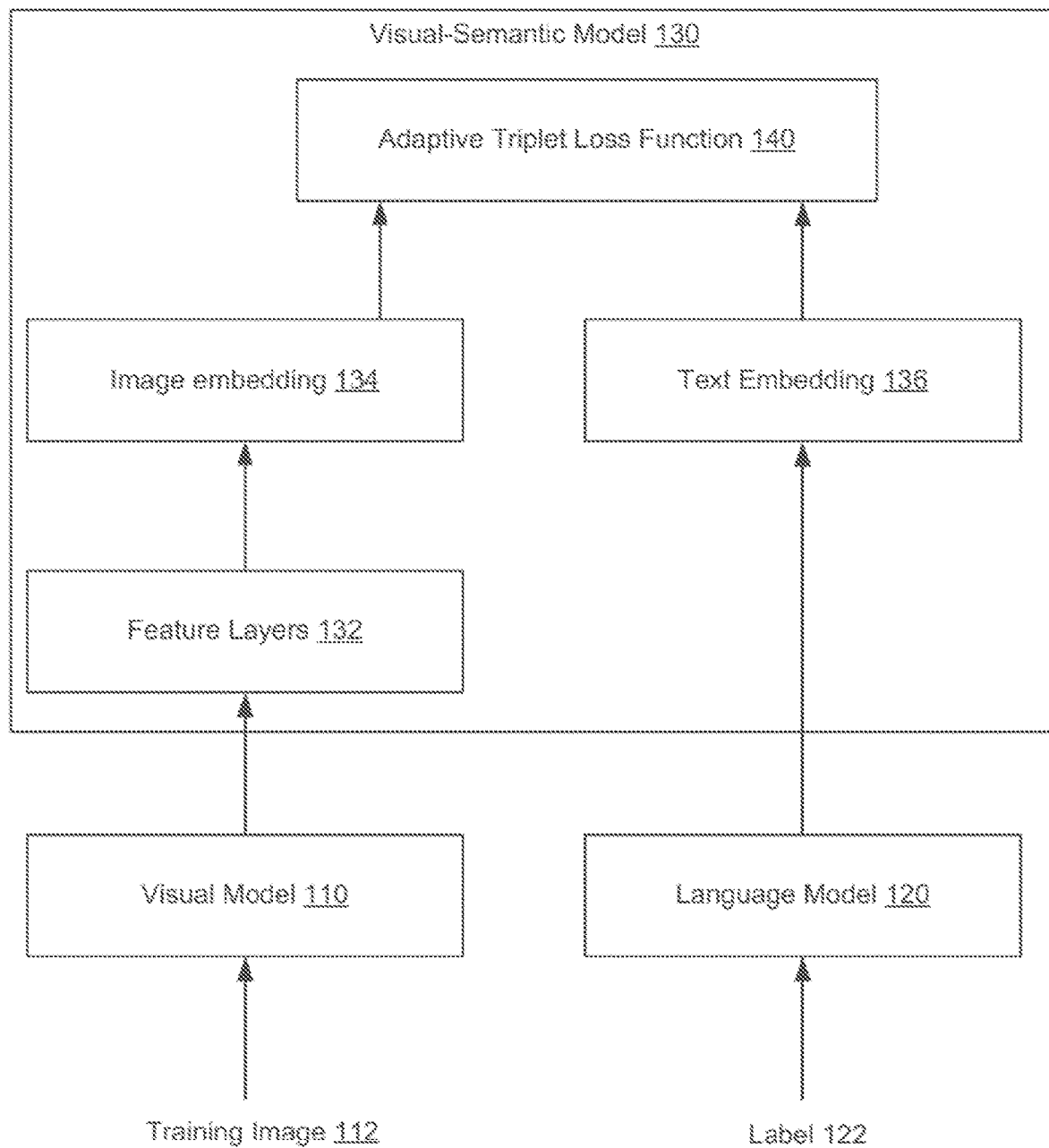
FIG. 1 illustrates an artificial intelligence model for text-based image searches according to various embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The volume of photos taken by a user with a mobile computing device camera challenges the current design of image search engines that use, for example, image albums. It is difficult for one person to categorize their own images in an image album much less to define a structured taxonomy that could be used to accurately retrieve any images based on a keyword search. The volume of captured images also makes it challenging to scroll backward in time to find images captured a few days ago, let alone months or years ago.

Aspects of the present disclosure include methods for using an artificial intelligence (AI) model that supports text-based image searches. In an example, upon receiving a keyword, a search engine uses the AI model to return a search result that includes a set of images related to the keyword. Rather than matching the keyword to pre-defined categories, the AI model uses an embedding space that jointly embeds image vectors representing image features and word vectors representing text features. A word vector is generated from the keyword and represents text features of the keyword. The word vector is used to find related image vectors. Images corresponding to the related image vectors are returned as the search result.

Generally, the embedding space is generated during the training of the AI model. The training relies on triplets, where a first element of the triplet is associated with a label of a training image, a second element of the triplet is associated with a predicted label, and a third element of the triplet is associated with another predicted label. The goal of the training is to minimize the difference between the label and the predicted labels by improving the predictions. To increase the robustness of the training and the accuracy of the search results, the training involves an adaptive triplet loss function that automatically weighs the triplets. In particular, the adaptive triplet loss function weighs down triplets that do not provide informative supervision after as few steps of learning during the training and weighs up triplets that provide such informative supervision. As a result the AI model can more effectively learn a better visual-semantic embedding and significantly improve the text-based image search accuracy.

The AI model allows the use of new keywords to search and receive relevant images. This is because new keywords can be analyzed and a word vector representing text features of the keywords and of related keywords can be generated dynamically. Thus, an image search request based on "dogs," "dachshund," or "pup" would return similar image results.

Referring first to FIG. 1, an AI model 100 for text-based image searches according to various embodiments of the present disclosure is illustrated. A computing device, such as a mobile communication device, can store code of the AI model 100. The code can be implemented as part of a search engine for generating search results that include images in response to keyword inputs that include text.

In an example, the AI model 100 includes a visual model 110, a language model 120, and a visual-semantic model 130. The visual model 110 and the language mode 120 are pre-trained (e.g., their training is performed prior to the training of the AI model 110) to generate image vectors that include image features and word vectors that include text features, respectively. The training of the AI model 100 includes training the visual-semantic model 130 to project the text features and image features into an embedding space.

In particular, during the training of the AI model 100, training images having labels are received. A label 122 of a training image 112 is input to the language model 120. In response, the language model 120 generates a word vector containing text features of the label. The training image 112 is also input to the visual model 110. In response, the visual model 110 generate an image vector containing image features of the training image 112. The visual-semantic model 130 is trained to predict text features given image features. For instance, a triplet is defined for the training image 112, where a first element of the triplet includes the text features of the training image 112 as learned by the language model 120 (e.g., this element is used as ground truth), a second element of the triplet includes first predicted text features to be output by the visual-semantic model 130, and a third element of the triplet includes second predicted text features to be output by the visual-semantic model 130. The purpose of the training is to minimize an adaptive triplet loss function 140 of the visual-semantic model 130 by minimizing the difference between the ground truth and predicted text features, and to update parameters of the visual-semantic model 130 through backpropagation based on the adaptive triplet loss function 140. The adaptive triplet loss function 140 is used to improve the robustness and efficiency of the training by weighing up and down the triplets.

Upon completion of the training, images associated with an image album of the computing device are indexed by the AI model 100. For example, an image may already exist in the image album or may be a new image being added to the image album. The image is input to the AI model 100. In response, the AI model 100 computes image features of the image as an image vector via the visual model 110 and to then compute its text features from the image features as a word vector via the visual-semantic model 130. The embedding space can be defined by associating the image with the image vector and the word vector. Upon a user input that includes a text query, the AI model 100 computes a word vector from the text query via the language model 130 and finds the set of the nearest images in the embedding space. For instance, the nearest images are associated with word vectors in the embedding space, where the word vectors have the smallest Euclidean distances relative to the word vector of the text query. The top ranked images are returned as the search result.

In an example, the visual model 110 includes a deep neural network for visual object recognition. The deep neural network consists of several convolutional filtering with skip connections, batch normalization, and pooling layers, followed by several fully connected neural network layers. The deep neural network model is pre-trained with a softmax output layer to predict one of one-thousand object categories from a predefined training dataset of training images. The output of the last average-pooling-layer, which is a 2,048-dimensional vector, serves as the image vector for an image. This output is shown in FIG. 1 as part of image embedding 134, where the image embedding 134 includes, during the training, the various image vectors corresponding to the training images and includes, in operation after the training, an image vector for an image to be indexed.

The language model 120 includes an artificial neural language model pre-trained for learning semantically-meaningful, dense vector representations of words. The pre-training can, but need not, be performed in parallel to the pre-training of the visual model 110. In an example, the artificial neural network is based on a skip-gram text modeling architecture and learns to represent each term as a fixed length embedding vector by predicting adjacent terms in the unannotated text. The resulting vector representations are word vectors containing text features. A 300-dimensional word vector can be used to represent the label of each training image in the predefined training dataset. This output is shown in FIG. 1 as part of text embedding 136. The text embedding 136 includes, during the training, the various word vectors corresponding to the labels of the training images and includes, in operation after the training, a text vector for a query.

The visual-semantic model 300 includes a deep neural network for projecting image features and text features into the same embedding space and, subsequently, for retrieval of an image by searching the nearest neighbor in the embedding space. In an example, the deep neural network includes low layers of the pre-trained visual model 110. These layers are illustrated in FIG. 1 as feature layers 132 and are re-trained to predict a word vector of a training image based on the corresponding word vector that is output from the language model 120. The training of the visual-semantic model 130 uses the adaptive triplet loss function 140.

The adaptive triplet loss function 140 can optimize the embedding space. In particular, the possible number of the triplets increases cubically and theoretically there could be almost unlimited number of pairs that can be generated, making the training of all the possible triplets impractical. In addition, a large fraction of the triplets would not provide informative supervision after a few steps of learning, as they are so easy that the visual-semantic model 300 can quickly learn to correctly distinguish them. Intuitively, being informed over and over again that the same concept has similar viewpoints (easy positives) and different concepts have different viewpoints (easy negatives) would not improve a discriminative visual-semantic embedding. In comparison, using images of the same concept with very different scenes and viewpoints (hard positives), and different images with very similar looking (hard negatives) can significantly improve the capability of distinguishing visual concepts.

Because of this technical challenge, the adaptive triplet loss function 140 can up-weigh the hard triplets training samples and relatively down-weigh the easy triplets adaptively. By mapping the original distance in the embedding space to an exponential kernel space, the hard triplets are penalized much more than the easy ones, which can thus adaptively focus on hard examples.

To do so, the adaptive triplet loss function 140 can be formulated as follows:

$$sim(a, b) = \frac{a \times b}{|a| \times |b|},$$

$$d = -sim(x_a, x_p) + im(x_a, x_n) + 1, \text{ and}$$

$$loss = \max\left(0, e^{\frac{d}{2\sigma}} d + m\right)$$

In the above equations, "m" is a margin, "$x_a$," "$x_p$," and "$x_n$" are the ground truth (target), positive, and negative elements correspondingly. "sim(a,b)" is the similarity between data point "a" and "b," and "d" is the total distance of the triplet. A triplet for an image is defined as the combination of a word vector that is output by the language model 110 for the image (e.g., "$x_a$" is the word vector), a first word vector predicted by the visual-semantic model 130 (e.g., "$x_p$" is the first word vector), and a second word vector predicted by the visual-semantic model 130 (e.g., "$x_n$" is the second word vector).

As discussed above, a hard triplet is defined as the images with larger d value (e.g., large similarity between target and negative elements, while small similarity between target and positive elements). Larger distances are enlarged by weighing and transposing them to the embedding space, much more than those images with smaller distances. Thus, the harder the input triplet sample is to classify, the more penalty it receives relatively. Once initial rounds of model training are achieved, the subsequent rounds of the model training can automatically focus on identification and classification of hard triplets.

The use of the adaptive triplet loss function 140 typically does not introduce any extra computational resource cost for the training and the operation. The adaptive triplet loss function 140 can also significantly improve the learning (e.g., to find better network parameters that can generate a more discriminative visual-semantic embedding).

Figure 2A:
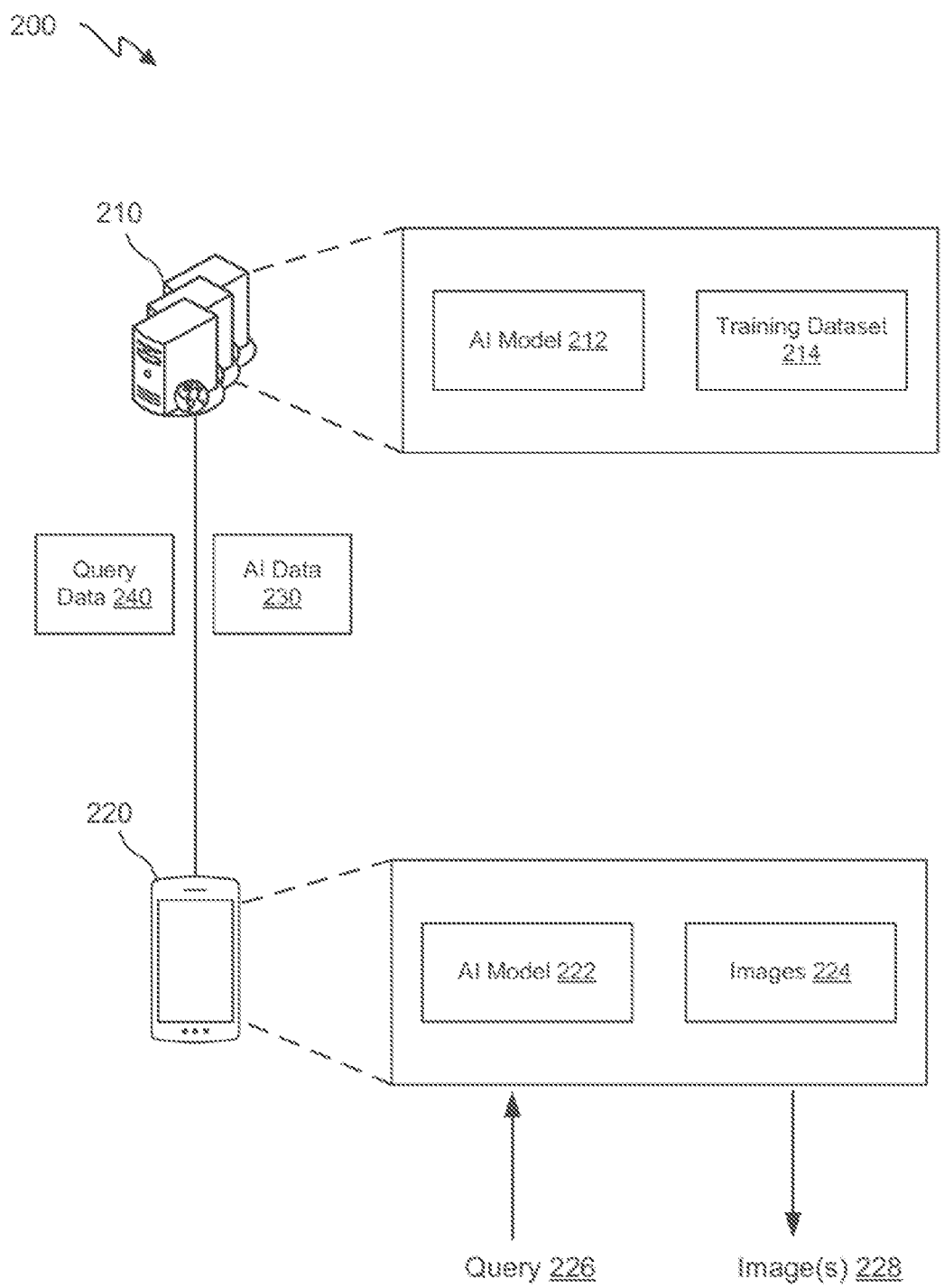
FIGS. 2A, 2B, 2C, and 2D are block diagrams illustrating example image search result sets in accordance with various embodiments of the present disclosure.

FIGS. 2A, 2B, 2C, and 2D are block diagrams illustrating example image search result sets in accordance with various embodiments of the present disclosure. In particular, FIG. 2A illustrates an example computer network environment 200 for training and operating an AI model, such as the AI model 100 of FIG. 1, for text-based image searches. The network environment 200 includes a computer system 210 and a user device 220.

In an example, the computer system 210 represents a set of servers that stores an AI model 212 as a set of software code and training dataset 214. The training of the AI model 212 is performed by the computer system 210 based on the training dataset 214. Once trained, the computer system 210 sends AI data 230 to the user device 220.

In an example, the AI data 230 includes the software code of the artificial model 212. In this case, the user device 220 downloads the software code and stores it locally in the memory of the user device 220 as an AI model 222. The user device 220 also stores images 224. Such images 224 can be generated by a camera of the user device or received from one or more content sources. The user device 220 generates an embedding space from the images 224 by using the AI model 222 to generate image vectors and word vectors from the images 224. The user device 220 also receives, at an input interface of the user device 220 (e.g., a keyboard, a microphone, etc.) a query 226, generates a text from the query 226 (e.g., a keyword search) and inputs the text to the AI model 222. In response, the AI model 222 outputs identifiers of images 228 from the images 224 as a search result. The images 228 are determined based on a match between a word vector generated by the AI model 222 from the text and word vectors in the embedding space. The user device 220 presents the image(s) 228 at the same or a different user interface.

In another example, the user device 220 does not download the AI model 212. Instead, in response to receiving the query 226, the user device 220 sends the text as query data 240 to the computer system 210. In turn, the computer system inputs the query data 240 to the AI model 212. In turn, the AI model 212 outputs the identifiers of the image(s) 228 and sends the identifiers as part of the AI data 230. In addition, the images 224 need not be stored on the user device 220 and can be stored on the computer system 210 instead. In this case, the AI data 230 also includes the images 228 or links to their storage location on the computer system 210.

In both examples, the user device 220 can be a computing device that that is operable by an end user and that includes one or more processors and one or more memories storing, as applicable, instructions that are executable by at least one of the one or more processors to perform the above functionalities. The user device 220 can be a mobile device, a tablet, a laptop, a personal computer, or any other computing device available to a user and suitable for performing the above functionalities.

Figure 2B:
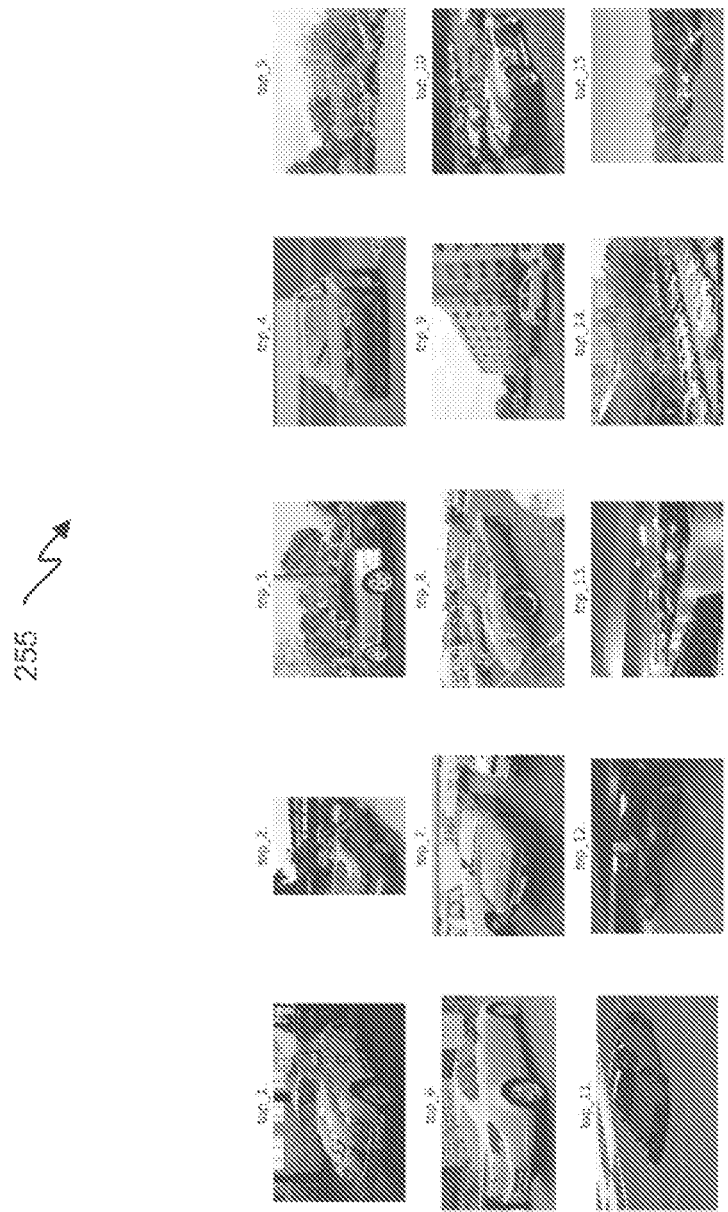
Figure 2C:
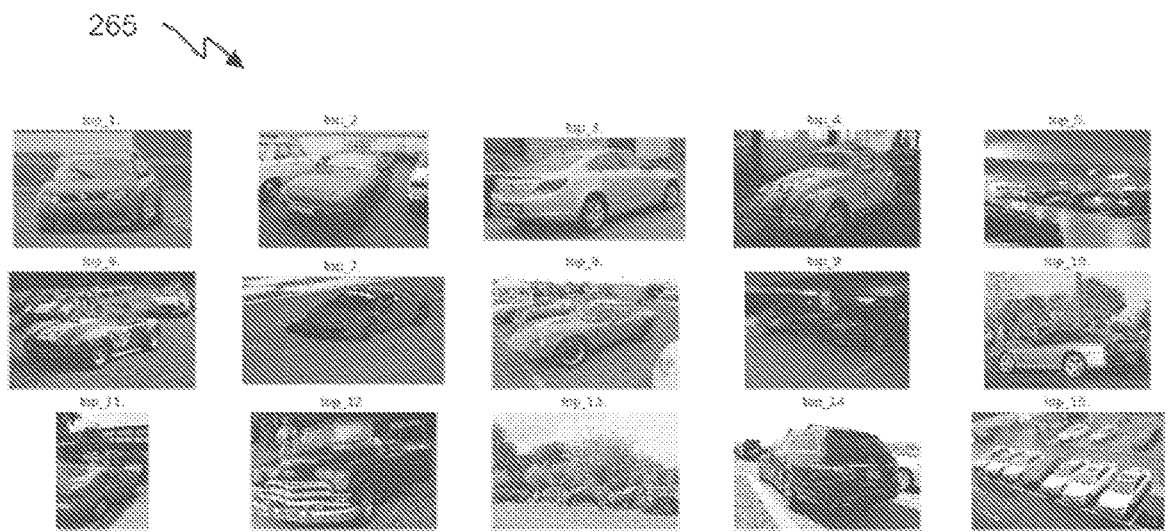
Figure 2D:
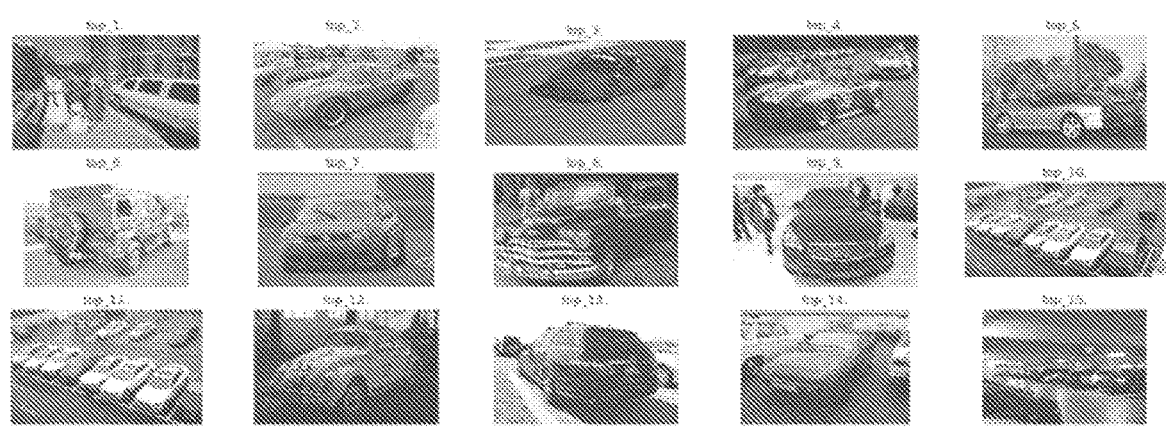

Each of FIGS. 2B, 2C, and 2D illustrates example image search results retrieved using different keywords. In particular, FIG. 2B illustrates the top ranked images 255 based on the query 226 that includes the term "car." In comparison, FIG. 2C illustrates top ranked images 265 based on the query 226 that includes term "vehicle." And FIG. 2D illustrates top ranked images 275 based on the query 226 that includes a particular car model (e.g., the term is "Car Brand XYZ"). As can be seen in the images 255, 265, and 275, the search results includes images of automobiles although different query terms were used. Further, even when the images 224 do not include images of the particular car model, the AI model 222 (or the AI model 212) is capable of returning images showing automobiles. Hence, such an AI model improves the overall user experience by improving the text-based image search functionality.

In other words, relative to known techniques, the overall user experience is improved in terms of search result retrieval. Instead of a "No search result" due to a miss-matched keywords (e.g., in response to the "Car Brand XYZ" query 226), the AI model 222 (or the AI model 212) returns the most semantically related images, which is more intuitive and effective to catch user's real query intention.

Figure 3:
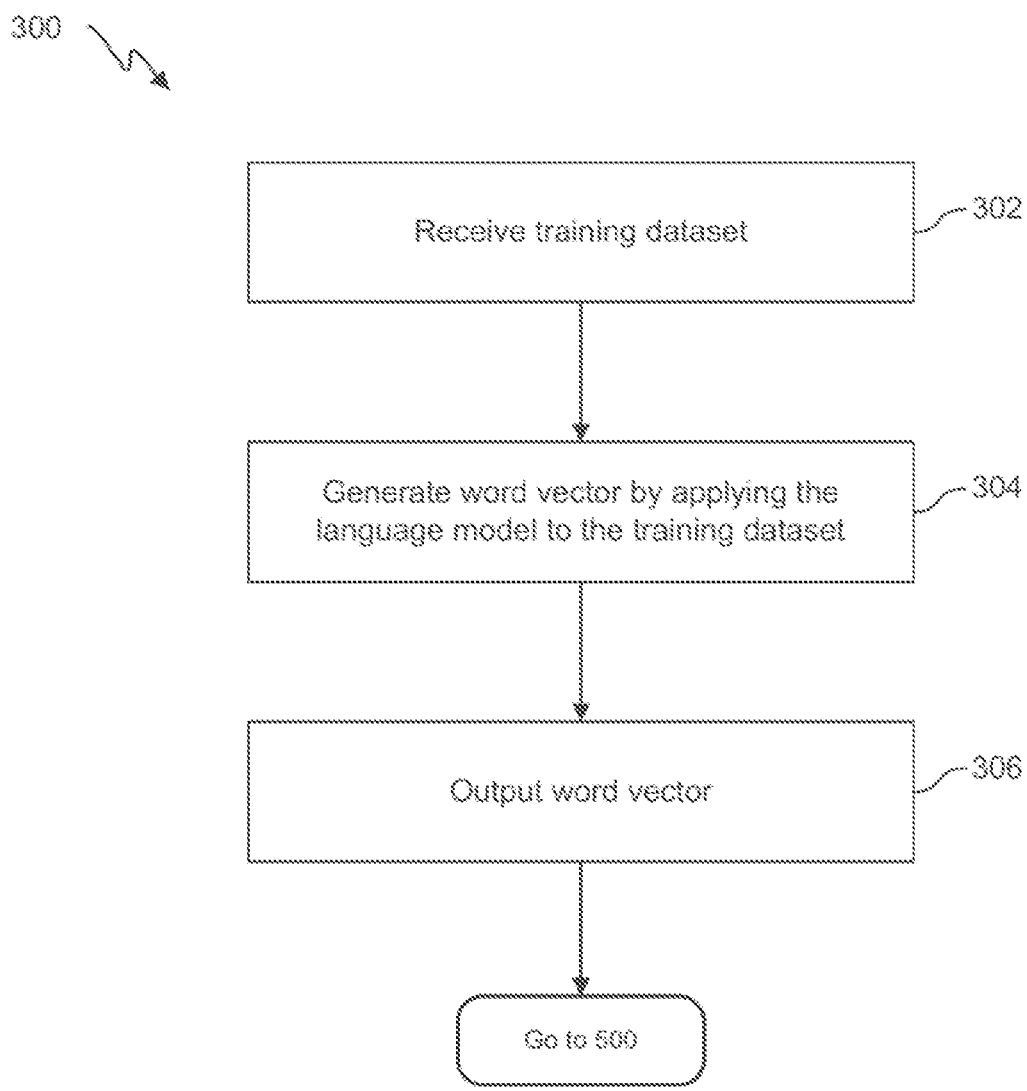
FIG. 3 illustrates an example method for using a language model of an AI model in the training of a visual-semantic model of the AI model, according to various embodiments of the present disclosure.

FIG. 3 illustrates an example method 300 for using a language model of an AI model in the training of a visual-semantic model of the AI model, according to various embodiments of the present disclosure. The AI model, the language model, and the visual-semantic model are examples of the AI model 100, the language model 120, and the visual-semantic model 130 of FIG. 1, respectively. Instructions for performing blocks of the method 300 can be stored as computer-readable instructions on non-transitory computer-readable media of a system, such as one including the computer system 210 and/or the user device 220 of FIG. 2A. Each block represents a set of operations. As stored, the instructions represent programmable modules that include code executable by one or more processors of the system. The execution of such instructions configures the system to perform the specific operations described herein. Each programmable module in combination with the respective processor represents a means for performing a respective operation(s). While the blocks and operations are illustrated in a particular order, it should be understood that no particular order is necessary and that one or more blocks and/or operations may be omitted, skipped, and/or reordered.

In an example, the method 300 starts at block 302. At block 302, the system can receive a training dataset in preparation for training the visual-semantic model. For example, a processing device of the system can retrieve the training dataset from a memory. Further, a transceiver may be used to retrieve the training dataset from a remote device. The training dataset can include training images and labels of the training images. Each label can be stored as text in the training dataset.

At block 304, the system can generate a word vector by applying the language model to the training dataset. For example, the system generates a word vector for each label in the training dataset by inputting the label to the language model. Each word vector includes 300-dimensional text features. In this example, the language model is pre-trained to generate the word vector. The pre-training involves the use of unannotated text available from one or more documents to learn semantically-meaningful floating-point representations of terms from the unannotated text.

At block 306, the system outputs the word vector. For example, each word vector is associated with a training image and is output from the language model to the visual-semantic model. Such word vectors are subsequently used in the training of the visual-semantic model as further described in connection with FIG. 5.

Figure 4:
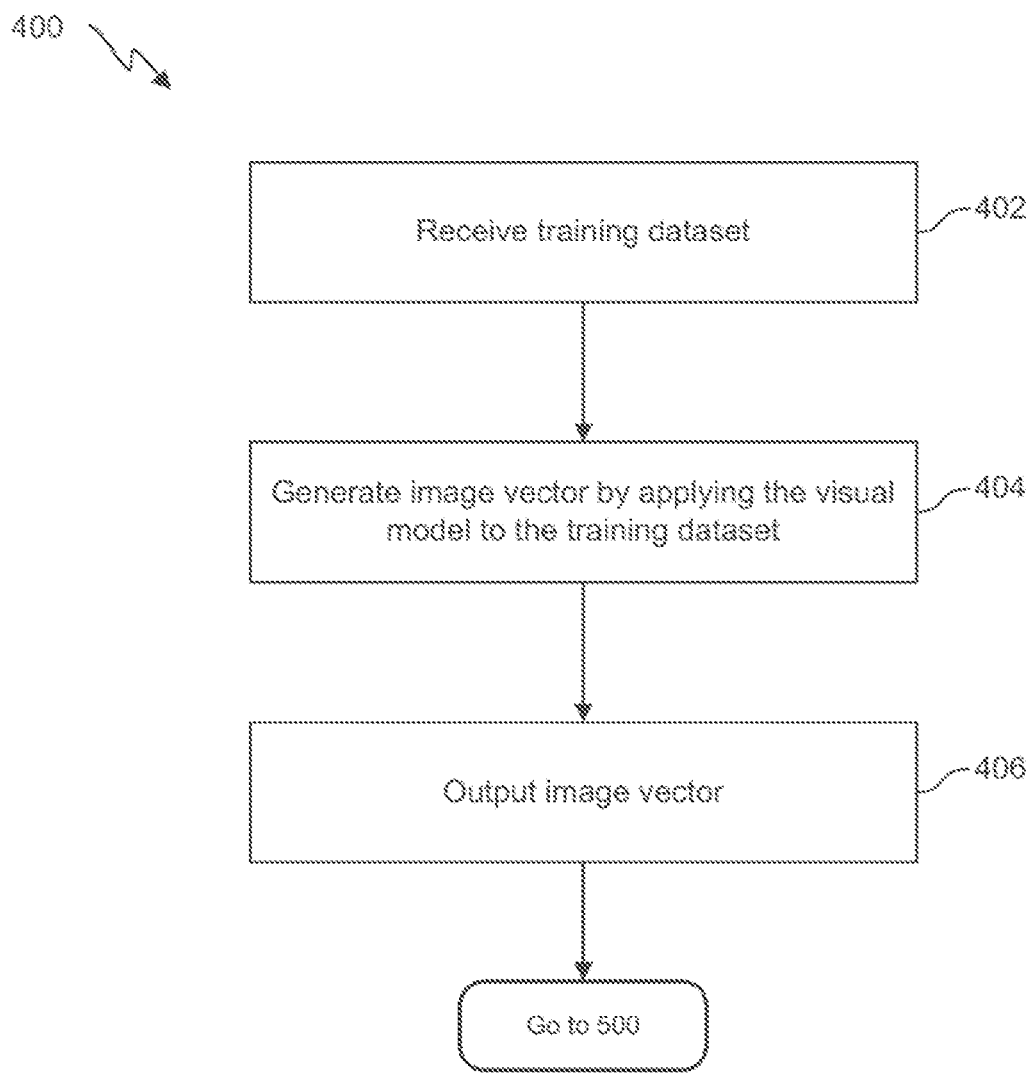
FIG. 4 illustrates an example method 400 for using a visual model of an AI model in the training of a visual-semantic model of the AI model, according to various embodiments of the present disclosure.

FIG. 4 illustrates an example method 400 for using a visual model of an AI model in the training of a visual-semantic model of the AI model, according to various embodiments of the present disclosure. The AI model, the visual model, and the visual-semantic model are examples of the AI model 100, the visual model 110, and the visual-semantic model 130 of FIG. 1, respectively. The method 400 can be performed in parallel to the method 300. Instructions for performing blocks of the method 400 can be stored as computer-readable instructions on non-transitory computer-readable media of a system, such as one including the computer system 210 and/or the user device 220 of FIG. 2A. Each block represents a set of operations. As stored, the instructions represent programmable modules that include code executable by one or more processors of the system. The execution of such instructions configures the system to perform the specific operations described herein. Each programmable module in combination with the respective processor represents a means for performing a respective operation(s). While the blocks and operations are illustrated in a particular order, it should be understood that no particular order is necessary and that one or more blocks and/or operations may be omitted, skipped, and/or reordered.

In an example, the method 400 starts at block 402. At block 402, the system can receive a training dataset in preparation for training the visual-semantic model. For example, a processing device of the system can retrieve the training dataset from a memory. Further, a transceiver may be used to retrieve the training dataset from a remote device. The training dataset can include training images.

At block 404, the system can generate an image vector by applying the visual model to the training dataset. For example, the system generates an image vector for each training image in the training dataset by inputting the training image to the visual model. Each image vector includes 2,048-dimensional text features. In this example, the visual model is pre-trained to generate the image vector. The pre-training involves the use of a softmax output layer of the visual model to predict one of one-thousand object categories from a predefined training image dataset.

At block 406, the system outputs the image vector. For example, each image vector is associated with a training image and is output from the visual model to the visual-semantic model. Such image vectors are subsequently used in the training of the visual-semantic model as further described in connection with FIG. 5.

Figure 5:
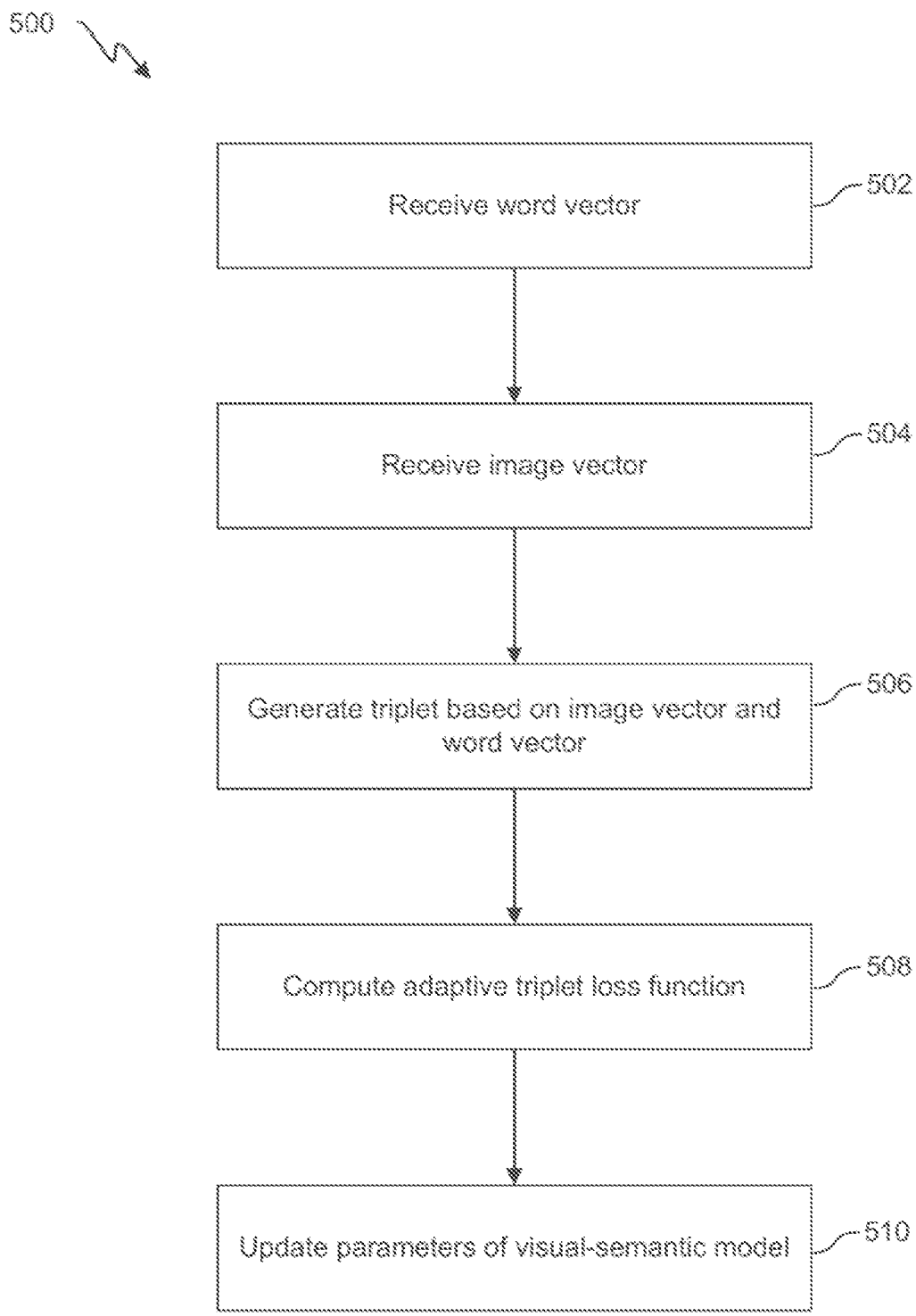
FIG. 5 illustrates an example method 500 for using training a visual-semantic model of an AI model, according to various embodiments of the present disclosure.

FIG. 5 illustrates an example method 500 for using training a visual-semantic model of an AI model, according to various embodiments of the present disclosure. The AI model and the visual-semantic model are examples of the AI model 100 and the visual-semantic model 130 of FIG. 1, respectively. Instructions for performing blocks of the method 500 can be stored as computer-readable instructions on non-transitory computer-readable media of a system, such as one including the computer system 210 and/or the user device 220 of FIG. 2A. Each block represents a set of operations. As stored, the instructions represent programmable modules that include code executable by one or more processors of the system. The execution of such instructions configures the system to perform the specific operations described herein. Each programmable module in combination with the respective processor represents a means for performing a respective operation(s). While the blocks and operations are illustrated in a particular order, it should be understood that no particular order is necessary and that one or more blocks and/or operations may be omitted, skipped, and/or reordered. Further, in the interest of clarity of explanation, the method 500 is illustrated in connection with a triplet. However, the operations of the method 500 can be iteratively repeated by using the triplet and update a loss function and the blocks can be iteratively performed for multiple triplets. The iterations of the operations and blocks can be sequential or parallel to each other.

In an example, the method 500 starts at block 502. At block 502, the system receives a word vector. For example, the word vector is received from a language model and corresponds to a label of a training image.

At block 504, the system receives an image vector. For example, the image vector is received from a visual model and corresponds to the training image.

At block 506, the system generates a triplet based on the image vector and the word vector. For example, the system inputs the image vector to the visual-semantic model. In turn, the visual-semantic model generates a first predicted word vector and a second predicted word vector given the image features from the image vector. The system generates the triplet as including the word vector that is output from the language model as a first element of the triplet, the first predicted word vector as a second element of the triplet, and the second predicted word vector as the third element of the triplet.

At block 508, the system computes an adaptive loss function of the visual-semantic model. For example, the system uses the equations described herein above in connection with FIG. 1 to compute a total distance of the triplet. The adaptive loss function is set as a function of the total distance.

At block 510, the system updates one or more parameters of the visual-semantic model. For example, backpropagation is used to update the one or more parameters. The above operations and/or blocks are iteratively repeated with the goal of updating such parameters to improve the predicted word vectors and minimize the adaptive loss function.

Figure 6:
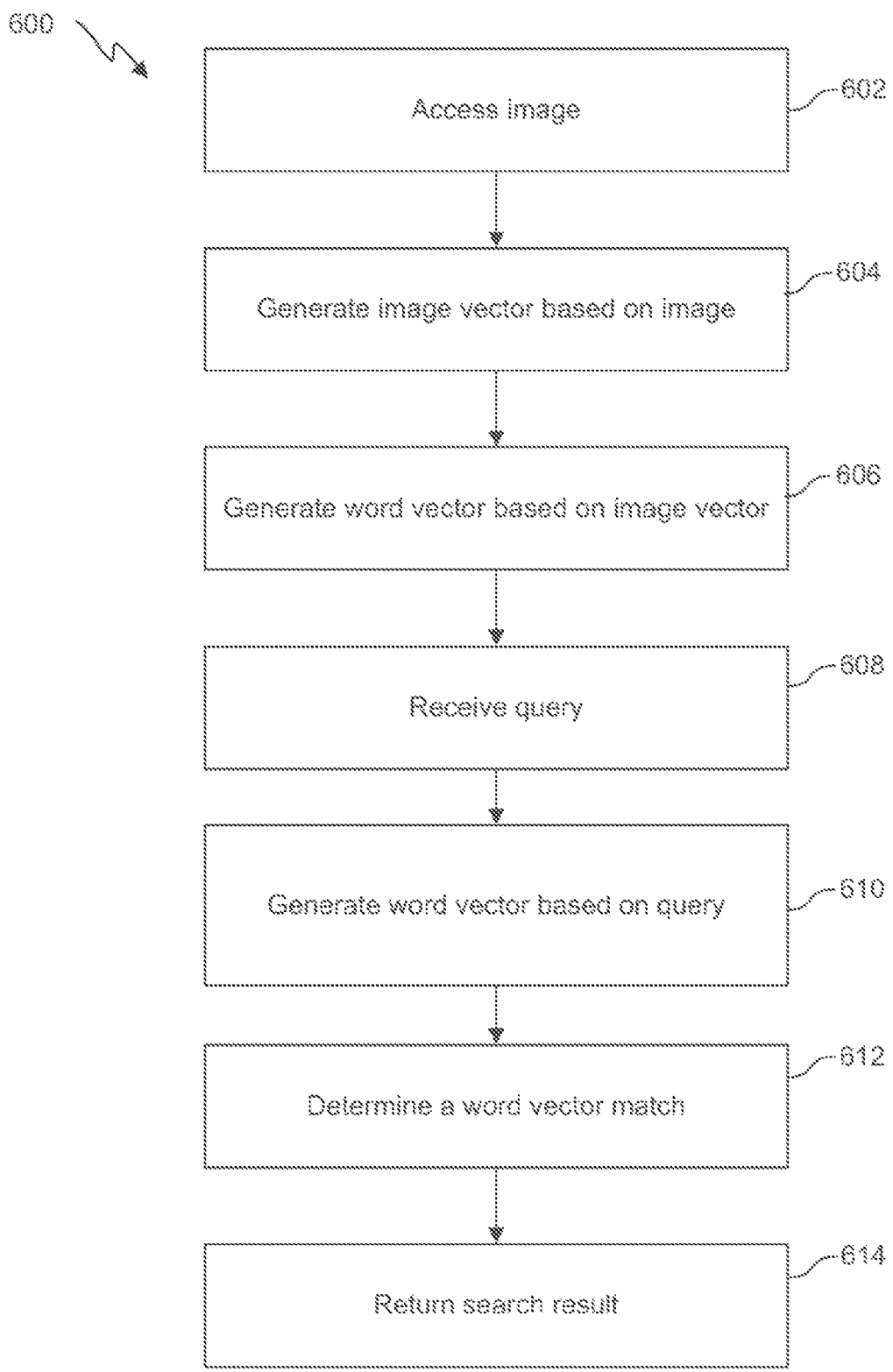
FIG. 6 illustrates an example method 600 for performing image searches on a user device, according to various embodiments of the present disclosure.

FIG. 6 illustrates an example method 600 for performing image searches on a user device, according to various embodiments of the present disclosure. Instructions for performing blocks of the method 600 can be stored as computer-readable instructions on non-transitory computer-readable media of the user device, such as the user device 220 of FIG. 2. Each block represents a set of operations. As stored, the instructions represent programmable modules that include code executable by one or more processors of the user device. The execution of such instructions configures the user device to perform the specific operations described herein. Each programmable module in combination with the respective processor represents a means for performing a respective operation(s). While the blocks and operations are illustrated in a particular order, it should be understood that no particular order is necessary and that one or more blocks and/or operations may be omitted, skipped, and/or reordered. Further, in the interest of clarity of explanation, the method 600 is illustrated in connection with an AI model that has been downloaded to the user device. However, and as described herein above in connection with FIG. 2A, some or all of the blocks and/or operations of the method 600 can be executed on a computer system. A data exchange between the user device and the computer system can be performed to submit a query to the computer system and receive a search result, and can include, for instance, a web interface or application programming interface (API) calls.

In an example, the method 600 start at block 602. At block 602, the user device access an image. For example, the image exists in an image album stored locally on the user device or available from a remote computer system. In another example, the image is generated by a camera of the user device or is received from an online content server.

At block 604, the user device generates an image vector based on the image. For example, user device inputs the image to the AI model. In particular, the image is input to a visual model of the AI model. An output of the visual model is the image vector that includes image features learned from the image.

At block 606, the user device generates a word vector based on the image vector. For example, the image vector is input to a visual-semantic model of the AI model. An output of the visual-semantic model is the word vector that includes text features learned from the image features. Blocks 602-606 can be repeated for various images such that such images are indexed. The indexing here includes generating word vectors for such images, where such word vector are part of an embedding space of the AI model. The embedding space is usable for retrieving search results that identify some of the images. The embedding space can be stored by the user device and can include the word vectors, image vectors, and associations between the word vectors and/or image vectors and the images.

At block 608, the user device receives a query. For example, the query is received as user input at a user interface of the user device. The user input can be text representing a textual keyword search. The user input can also or alternatively be audio representing an audible keyword search and the audio can be converted to text using natural language processing.

At block 610, the user device generates a word vector based on the query. For example, the user device inputs the text associated with the query to the AI model. In particular, the text is input to a language model of the AI model. An output of the language model is the word vector that includes text features learned from the text.

At block 612, the user device determines a word vector match. For example, the user device compares the word vector generated at block 610 with word vectors from the embedding space generated at operation 606. The comparison can include finding the nearest neighbor to the word vector by computing Euclidean distances between the word vector and some or all of the word vectors from the embedding space. The top ranked word vectors (e.g., the ten closest, or some other user or device configurable number, of word vectors) are determined and the corresponding top ranked images are identified. The ranking of the images can depend on the Euclidean distances, where the smallest a Euclidean distance is, the higher the ranking of a corresponding image is.

At block 614, the user device returns a search result in response to the query. For example, the search result includes identifiers of the top ranked images. Such images (or a list or thumbnails thereof) can be displayed on a graphical user interface of the user device. In particular, the images can be displayed in an order of smallest calculated Euclidean distance to largest calculated Euclidean distance.

Figure 7:
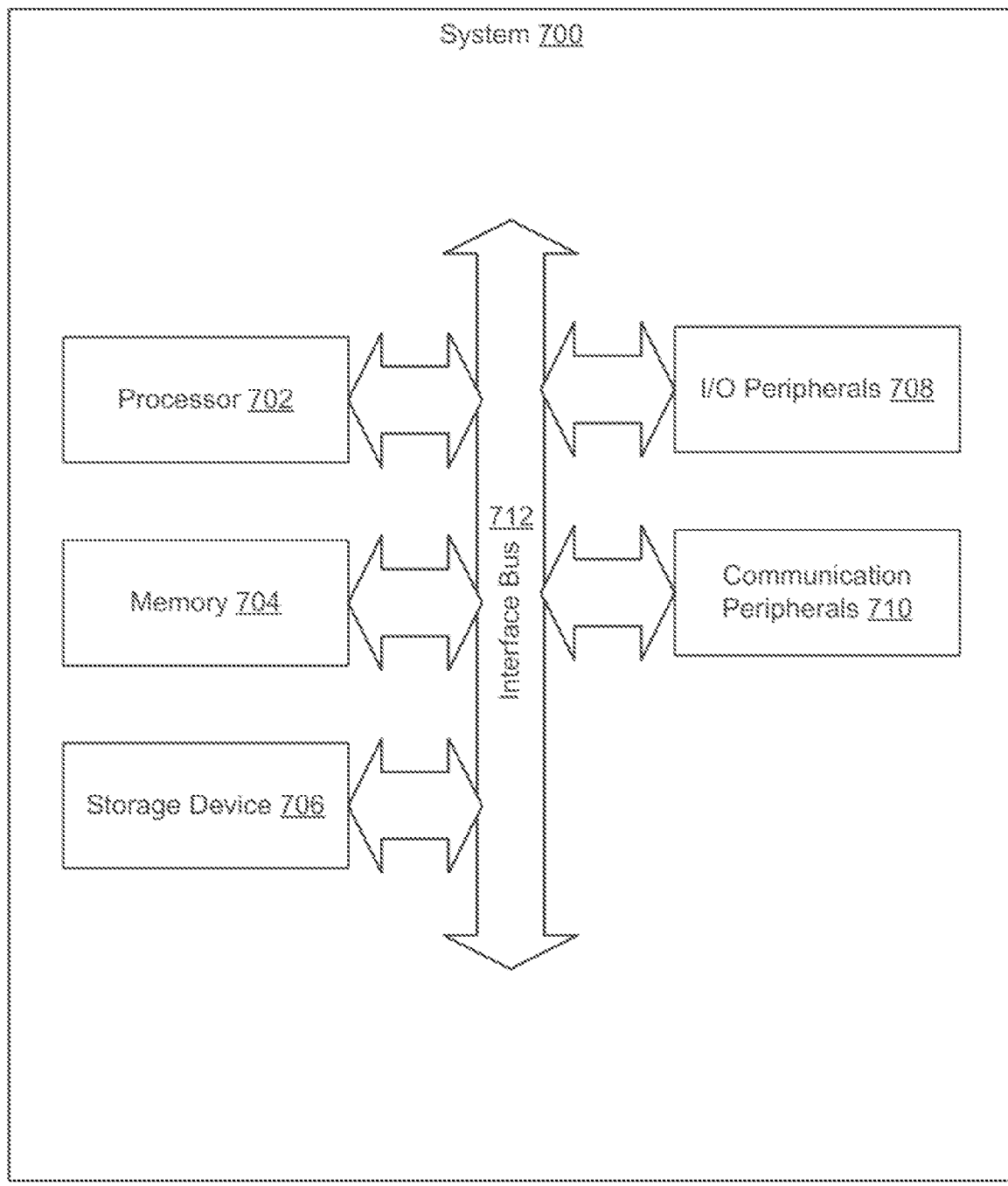
FIG. 7 illustrates examples of components of a system 700 according to certain embodiments.

FIG. 7 illustrates examples of components of a system 700 according to certain embodiments. The system 700 is an example of the computer systems and user devices described in connection with FIGS. 1-6. Although these components are illustrated as belonging to a same system 700, the system 700 can also be distributed.

The system 700 includes at least a processing device 702, a memory 704, a storage device 706, input/output peripherals (I/O) 708, communication peripherals 710, and an interface bus 712. The interface bus 712 is configured to communicate, transmit, and transfer data, controls, and commands among the various components of the system 700. The memory 704 and the storage device 706 include computer-readable storage media, such as RAM, ROM, electrically erasable programmable read-only memory (EE-PROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 704 and the storage device 706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the system 700.

Further, the memory 704 includes an operating system, programs, and applications. The processing device 702 is configured to execute the stored instructions and includes, for example, a logical processing unit, a micro processing device, a digital signal processing device, and other processing devices. The memory 704 and/or the processing device 702 can be virtualized and can be hosted within another computing system of, for example, a cloud network or a data center. The I/O peripherals 708 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 708 are connected to the processing device 702 through any of the ports coupled to the interface bus 712. The communication peripherals 710 are configured to facilitate communication between the system 700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose micro processing device-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an openended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system comprising:
   one or more processors; and
   one or more memories storing instructions that, upon execution by at least one of the one or more processors, cause the system to perform operations including:
   generating an image vector from an image based on an artificial model;
   generating a first word vector from the image vector based on the artificial model;
   receiving a query associated with an image search;
   generating, based on the artificial model, a second word vector from text associated with the query;
   determining a match between the first word vector and the second word vector; and
   generating, based on the match, a search result that identifies the image;
   wherein the operations further include training the artificial model by at least:
   generating, based on the artificial model, a third word vector from a label associated with a training image;
   generating, based on the artificial model, a second image vector from the training image;
   generating, based on the artificial model, a first predicted word vector from the second image vector;
   computing a loss of the artificial model based on the third word vector and the first predicted word vector; and
   updating a parameter of the artificial model based on the loss.

2. The system of claim 1, wherein the system is a mobile device, and wherein the operations further include:
   storing the artificial model in the one or more memories of the mobile device; and
   displaying the search result on a user interface of the mobile device.

3. The system of claim 2, wherein the operations further include:
   storing the image in association with an image album; and
   storing word vectors for images associated with the image album,
   wherein the match is determined based on Euclidean distances between the first word vector and the word vectors.

4. The system of claim 3, wherein displaying the search result includes displaying a subset of the images in an order of smallest Euclidean distance to largest Euclidean distance.

5. The system of claim 1, wherein the training further includes:
   generating, based on the artificial model, a second predicted word vector from the second image vector; and
   generating a triplet that includes the third word vector, the first predicted word vector, and the second predicted word vector, wherein the loss is computed based on the triplet.

6. The system of claim 5, wherein computing the loss includes computing a total distance of the triplet based on third word vector, the first predicted word vector, and the second predicted word vector, and wherein the loss is based on the total distance.

7. The system of claim 1, wherein the artificial model includes a language model, a visual model, and a visual-semantic model.

8. The system of claim 7, wherein the image vector is an output of the visual model, wherein the first word vector is an output of the visual-semantic model, and wherein the second word vector is an output of the language model.

9. The system of claim 7, wherein the operations further include training the visual-semantic model based on word vectors that are output of the language model and on image vectors that are output of the visual model.

10. A method implemented by a system, the method including:
    generating an image vector from an image based on an artificial model;
    generating a first word vector from the image vector based on the artificial model;
    receiving a query associated with an image search;
    generating, based on the artificial model, a second word vector from text associated with the query;
    determining a match between the first word vector and the second word vector; and
    generating, based on the match, a search result that identifies the image;
    wherein the method further includes training the artificial model by at least:
    generating, based on the artificial model, a third word vector from a label associated with a training image;
    generating, based on the artificial model, a second image vector from the training image;
    generating, based on the artificial model, a first predicted word vector from the second image vector;

computing a loss of the artificial model based on the third word vector and the first predicted word vector; and updating a parameter of the artificial model based on the loss.

11. The method of claim 10, further including:

storing the artificial model in a one or more memories of the system; and displaying the search result on a user interface of the system.

12. The method of claim 11, further including:

storing the image in association with an image album; and storing word vectors for images associated with the image album, wherein the match is determined based on Euclidean distances between the first word vector and the word vectors.

13. The method of claim 12, wherein displaying the search result includes displaying a subset of the images in an order of smallest Euclidean distance to largest Euclidean distance.

14. The method of claim 10, wherein the training further includes:

generating, based on the artificial model, a second predicted word vector from the second image vector; and generating a triplet that includes the third word vector, the first predicted word vector, and the second predicted word vector, wherein the loss is computed based on the triplet.

15. The method of claim 14, wherein computing the loss includes computing a total distance of the triplet based on third word vector, the first predicted word vector, and the second predicted word vector, and wherein the loss is based on the total distance.

16. A non-transitory computer readable media storing instructions that, upon execution on a system, cause the system to perform operations including:

generating an image vector from an image based on an artificial model;

generating a first word vector from the image vector based on the artificial model;

receiving a query associated with an image search;

generating, based on the artificial model, a second word vector from text associated with the query;

determining a match between the first word vector and the second word vector; and generating, based on the match, a search result that identifies the image;

wherein the operations further include training the artificial model by at least:

generating, based on the artificial model, a third word vector from a label associated with a training image;

generating, based on the artificial model, a second image vector from the training image;

generating, based on the artificial model, a first predicted word vector from the second image vector;

computing a loss of the artificial model based on the third word vector and the first predicted word vector; and updating a parameter of the artificial model based on the loss.

17. The non-transitory computer readable media of claim 16, wherein the operations further include storing the artificial model as including a language model, a visual model, and a visual-semantic model, wherein the image vector is an output of the visual model, wherein the first word vector is an output of the visual-semantic model, and wherein the second word vector is an output of the language model.

18. The non-transitory computer readable media of claim 17, wherein the operations further include training the visual-semantic model based on word vectors that are output of the language model and on image vectors that are output of the visual model.

* * * * *